United States Patent
Somerstein et al.

(10) Patent No.: US 7,254,290 B1
(45) Date of Patent: Aug. 7, 2007

(54) ENHANCED WAVEGUIDE METROLOGY GAUGE COLLIMATOR

(75) Inventors: Stephen F. Somerstein, Mountain View, CA (US); Paul V. Mammini, Rocklin, CA (US); William W. Anderson, Half Moon Bay, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 266 days.

(21) Appl. No.: 11/126,530

(22) Filed: May 10, 2005

Related U.S. Application Data

(60) Provisional application No. 60/569,231, filed on May 10, 2004.

(51) Int. Cl.
    *G02B 6/12*     (2006.01)
    *G01J 5/08*     (2006.01)
    *G01B 9/02*     (2006.01)

(52) U.S. Cl. .......................... 385/14; 385/12; 385/52; 385/31; 385/33; 385/129; 385/130; 385/42; 259/227.19; 356/450

(58) Field of Classification Search .................. 385/12, 385/13, 14, 31, 33, 34, 129, 130, 131, 42, 385/52; 250/227.11, 227.18, 227.19; 356/450, 356/600
See application file for complete search history.

(56) References Cited

U.S. PATENT DOCUMENTS

| | | | | |
|---|---|---|---|---|
| 5,537,209 A | * | 7/1996 | Lis | 356/487 |
| 7,006,235 B2 | * | 2/2006 | Levy et al. | 356/600 |
| 2004/0141676 A1 | * | 7/2004 | Bugaud et al. | 385/14 |
| 2005/0023434 A1 | * | 2/2005 | Yacoubian | 250/200 |
| 2006/0215175 A1 | * | 9/2006 | Yacoubian | 356/502 |

* cited by examiner

*Primary Examiner*—Brian M. Healy
(74) *Attorney, Agent, or Firm*—McDermott Will & Emery LLP

(57) ABSTRACT

A free-space optically-coupled collimator for the efficient bidirectional transmission of an optical metrology beam emanating from a waveguide aperture of a waveguide optical transmission element, all contained in an isothermal nested enclosure, with the waveguide element mounted in a stress-free fashion. The focus of the collimator is set at the waveguide aperture of the waveguide optical transmission element, the optical axis of the collimator aligns with the optical metrology beam as it exits the waveguide aperture of the waveguide optical transmission element, and the numeric aperture of the collimator is equal to or larger than the numeric aperture of the optical metrology beam as it exits the waveguide aperture of the waveguide optical transmission element.

40 Claims, 12 Drawing Sheets

| Wavelength (microns) | L = Flange to Focus (mm) | Effective Focal Length (mm) |
|---|---|---|
| 0.400 | 0.5 | 11.5 |
| 0.630 | 0.8 | 11.8 |
| 1.55 | 1.1 | 12.1 |

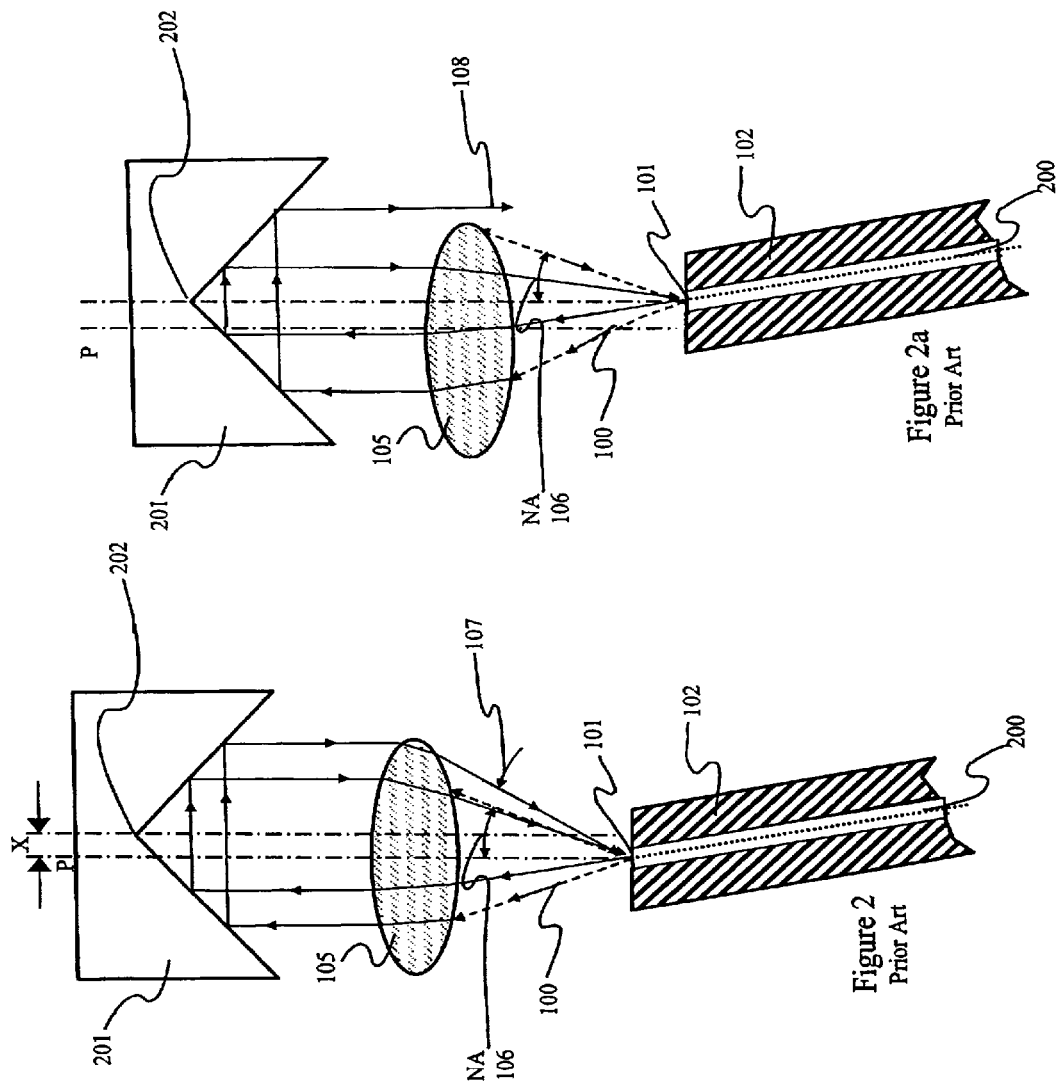

ENHANCED WAVEGUIDE METROLOGY GAUGE COLLIMATOR

This application claims the benefit of U.S. Provisional Application No. 60/569,231, filed May 10, 2004, which is hereby incorporated by reference.

STATEMENT AS TO RIGHTS TO INVENTIONS MADE UNDER FEDERALLY SPONSORED RESEARCH OR DEVELOPMENT

Not Applicable.

FIELD OF THE INVENTION

The present invention relates generally to metrology gauges, and more particularly relates to the improvement of metrology gauge precision using an enhanced collimator and mount design which utilizes an improved isothermal housing and low-stress waveguide mount.

BACKGROUND OF THE INVENTION

U.S. patent application Ser. No. 10/051,122 ("Bell") discloses a conventional robust heterodyne interferometer which incorporates a planar lightwave circuit ("PLC"), for precisely measuring distances. The conventional interferometer typically propagates a measurement optical signal through a single mode optical fiber or waveguide, where the optical signal exits the optical fiber or waveguide via an exit aperture into free space before passing through a collimating lens. The measurement optical signal is reflected off at least one reflective surface, and is returned through a collimating lens, leaving free space via the entrance aperture of an optical fiber or waveguide. The measurement beam is then processed in optical solid space according to known techniques, to precisely measure the distance or change of distance of the measurement beam path. According to at least one conventional configuration, the measurement beam passes in and out of the PLC via one optical fiber or waveguide using a combined exit/entrance aperture, passing bidirectionally through a single collimating element.

As a metrology gauge, conventional interferometers require a free-space optical coupling mechanism to expand and direct an outgoing beam to a retroreflecting reference fiducial, and to efficiently receive the returning measurement beam. Older, conventionally designed interferometer instruments include large, heavy, distributed assemblies of separate optical elements, such as beam-splitters and mirrors, which are held in place by a strong metal or non-metal framework, to maintain optical alignment. Large optical elements mounted on or within large optical benches are susceptible to significant optical displacements, misalignments and distortions, due to their sensitivity to mechanical and thermal environmental inputs.

FIGS. 1 to 3 illustrate several typical problems associated with collimating lenses used by conventional interferometric metrology gauges. In FIGS. 1 and 1A, for example, light beam 100 is emitted with a numerical aperture angle $NA_{fiber}$ from waveguide aperture 101 in optical fiber 102, which is itself embedded within PLC 104. Commonly, in order to reduce unwanted back reflections at the fiber-air interface, the aperture face is beveled at an angle, $\theta_1$, by lapping the aperture face. In accordance with Snell's Law, light beam 100 is refracted at an angle of $\theta_2$ as it exits optical fiber 102 into free space, where it is collimated by collimating lens 105. Ideally, the collimator's principle axis is coaligned with the refraction angle $\theta_2$. If, as shown in FIG. 1A, the lens numeric aperture is smaller than the fiber numeric aperture, the collimator will not collect all the outgoing photon flux, and the interferometer will lose signal power and/or sensitivity as a result.

In FIG. 2, the optical axis of collimating lens 105 is not aligned with optical apex 202 of the corner cube retroreflector 201. This may occur due to the collimating or projection optic becoming misaligned, or the interferometer optical bench itself deforming or shifting. Light beam 100 initially emerges from optical fiber aperture 101 with numeric aperture ($NA_{fiber}$) divergence 106. This beam then enters the projection optic 105 where it is collimated and projected to corner cube retroreflector 201. Due to the displacement X of the retroreflector corner cube apex 202 with respect to the collimator principle optical axis, the retroreflected return beam is laterally shifted a distance of 2X, causing a portion of returning focused beam 107 from collimator 105 to lie outside the fiber optic numeric aperture acceptance angle 106. This causes that portion of the beam to not enter the fiber optic aperture, resulting in a decrease in the intensity of the signal return, potentially compromising the required level of signal. Note that a lateral motion of the collimation optic or retroreflector perpendicular to the optical axis will not have an affect on the location of the returning focused beam, but will have an effect on the proportion of the beam return that falls within the fiber waveguide aperture acceptance angle.

In FIG. 2A, the optical axis of collimating lens 105 is not aligned with optical axis 200 of light beam 100, as it exits optical fiber 102 via aperture 101. Light beam 100 is collimated by collimating lens 105, and is reflected back towards PLC 104 by retroreflector 201. Returning, light beam 100 again passes through collimating lens 105. However, due to the lateral misalignment of lens 105, a portion of the returning beam 108 does not enter the lens and is clipped off from the collimated beam returning to waveguide aperture 101. This results in a decrease in the intensity of the signal return, potentially compromising the required level of signal.

If, as is illustrated in FIG. 3, collimator lens 105 is not optimally focused to project a collimated beam onto the corner cube retroreflector 202, then the beam returning from the retroreflector will not be perfectly focused at the entrance to the waveguide aperture 101. This will lead to the proper focus occurring before or after waveguide aperture 101, resulting in an overfill of the aperture. As with other misalignments, this leads to a reduced signal level and a lowering of the sensitivity and resolution of the metrology gauge.

One additional area of consideration which directly affects the metrology gauge performance is the wavefront quality delivered by collimator lens 105. The quality of the return beam focus, and the resulting beam fraction accepted by the waveguide aperture 101, is directly conditional on the outgoing beam quality projected by collimator lens 105, and the return beam which is retroreflected off of corner cube retroreflector 202 and returned through the same collimator lens 105, which then focuses it back onto the waveguide aperture 101. A poor quality focal beam wavefront will have significant energy in the Airy disk rings which will fall outside of the diameter of the waveguide aperture 101, thus decreasing the signal level.

As illustrated in the above examples, even small misalignments of the optical components can corrupt the signal, and have a large effect upon the ability of the conventional waveguide-type interferometer to accurately measure distances. Given that the major interferometer optical elements are discrete and are not subsumed into a simplified system, the waveguide output and return input are often ineffectively free-space coupled to the optical collimator.

Furthermore, the maintenance of an isothermal environment around the waveguide chip, especially across the opposing optical arms or channels of the waveguide, enhances the ability to obtain the maximum metrological measurement accuracy from the interferometer. Conventionally, bonding of the waveguide to a substrate is accomplished using epoxy agents which introduce a different coefficient of thermal expansion across the bond line, leading to thermally-induced stress and diminished measurement accuracy.

It is therefore considered highly desirable to provide an improved precision metrology gauge with an enhanced optical collimator and mount. In particular, it is desirable to provide for achieving a stable high measurement accuracy within a laboratory or measurement environment of diverse temperature gradients, without requiring perfect alignment of the collimator and/or retroreflecting element.

SUMMARY OF THE INVENTION

The present invention relates generally to metrology gauges, and more particularly relates to the improvement of metrology gauge precision using an enhanced collimator and mount design which utilizes an improved isothermal housing and low-stress waveguide mount.

According to one arrangement, the present invention is a free-space optically-coupled collimator for the efficient bidirectional transmission of an optical metrology beam emanating from a waveguide aperture of a waveguide optical transmission element. The focus of the collimator is set at the waveguide aperture of the waveguide optical transmission element, the optical axis of the collimator aligns with the optical metrology beam as it exits the waveguide aperture of the waveguide optical transmission element, and the numeric aperture of the collimator is equal to or larger than the numeric aperture of the optical metrology beam as it exits the waveguide aperture of the waveguide optical transmission element.

In this regard, the present invention provides for a simplified, self aligning, minimal-adjustment, free-space optical coupler/collimator for one or more optical arms of a planar waveguide interferometer, for inexpensive and convenient opto-mechanical alignment and manufacture.

The free-space optically-coupled collimator further includes at least one reflective or refractive element, where the free-space optically-coupled collimator maintains the high quality wavefront flatness necessary to return the focused beam to the fiber aperture and its subsequent waveguide circuit, with minimal coupling losses. The collimator quality is at a minimum $\frac{1}{10}$ wave Root Mean Square ("RMS") across the effective aperture for the operational wavelength of the interferometer. This is achieved, in the various embodiments of the optical collimator, with a plurality of optics, such as an off-axis parabola mirror, a multi-element corrected achromatic lens ensemble, a gradient-index lens such as the GRADIUM® brand lens produced by LIGHTPATH TECHNOLOGIES®, or an aspheric lens.

According to a second arrangement, the present invention is an interferometric optical metrology gauge system, including an interferometric device, and a free-space optically-coupled collimator for the efficient bidirectional transmission of optical metrology beam emanating from a waveguide aperture of one of a plurality of waveguide optical transmission elements. The interferometric device further includes a PLC including a plurality of waveguide optical transmission elements embedded in a substrate, and an input coupler and an output coupler arranged along the optical transmission elements and operable to determine reference and measurement optical phases, where optical pathlengths of the optical transmission elements between the input coupler and the output coupler are matched to compensate for thermal effects. Regarding the free-space optically-coupled collimator, the focus of the collimator is set at the waveguide aperture of the one of the plurality of waveguide optical transmission elements, the optical axis of the collimator aligns with the optical metrology beam as it exits the waveguide aperture of the one of the plurality of waveguide optical transmission elements, and the numeric aperture of the collimator is equal to or larger than the numeric aperture of the optical metrology beam as it exits the waveguide aperture of the one of the plurality of waveguide optical transmission elements.

The interferometric optical metrology gauge system further includes a remote fiducial reference, the remote fiducial reference reflecting an optical metrology beam emanating from the collimator back to the collimator, where the remote fiducial reference is a corner cube retroreflector, a spherical retroreflector, a "cats eye," or a mirror.

The interferometric optical metrology gauge system further includes an inner case encapsulating the interferometric device, the inner case forming an entrance/exit aperture adjacent to the waveguide aperture. The internal surface of the inner case is black and/or diffuse, and has an optical emissivity of approximately 1.

The nested cases form an attenuated path for thermal radiation, convection and conductivity, isolating the interferometer waveguide optical circuit from the temperature variations in the external environment. According to this embodiment, the inner and outer cases are made of aluminum (Al) and/or copper (Cu), although other materials, such as nonconductive plastics or ceramics may be employed that are provided with appropriate inner diffuse, high emissivity and outer specular, low emissivity coatings.

The interferometric device further includes a base plate in physical communication with the inner case, a silicon pedestal mounted on the base plate, and a potassium hydroxide (KOH)-based adhesive in physical communication with and between the substrate and the silicon pedestal, used to bond the waveguide substrate with the pedestal. In this embodiment, the pedestal mount is comprised of silicon, which matches the chemical, mechanical, and thermal conductive and thermal expansion coefficient of the silicon substrate of the optical waveguide. Although this embodiment is described as using silicon, any material that reduces mechanical and thermal stresses in the waveguide by matching the mechanical and thermal expansion properties of the waveguide substrate can be used.

According to the present embodiment, the silicon pedestal is 10 millimeters thick, and is used to mechanically and thermally isolate the optical waveguide substrate from the surrounding housing and mechanical mounts, used to affix the interferometer housing to an instrument surface. Though KOH bonding is suggested here, due to its desirable thin bond-line and non-introduction of bond agents possessing different thermal and mechanical properties, other bonding agents may be employed, such as epoxies, silicon rubber, and other agents which do not introduce mechanical and thermally-induced stresses.

In order to reduce the stress contribution due to thermal expansion of mechanical mounts supporting the silicon pedestal base plate, the material chosen for the base plate is the INVAR® 36 alloy, although other materials or alloys can be used as well. The selection of the INVAR® 36 alloy is based upon its low thermal expansion properties.

The optical waveguide circuit silicon substrate is 0.5 to 1 millimeters thick, and the silicon pedestal mount is 10 millimeters thick. The waveguide thickness may vary according to industry standards for the manufacture of optical waveguide circuits on and within a substrate. The supporting silicon pedestal thickness choice is based on the selection of a suitable thickness, where mechanical distortions occurring on the baseplate side of the pedestal will be damped and smoothed out, when propagated to the surmounted waveguide structure.

The interferometric optical metrology gauge system further includes an outer case encapsulating the inner case and the free-space optically-coupled collimator, the outer case forming a collimator aperture adjacent to the free-space optically-coupled collimator. The system also includes at least one insulating support in physical communication with and between the inner case and the outer case.

The maintenance of an isothermal environment around the waveguide chip, especially across the opposing optical arms or channels of the waveguide, is advantageous for obtaining high metrological measurement accuracy from the interferometer. In addition, a low stress mounting of the chip suppresses errors arising from thermal coefficient of expansion mismatches between the chip and its associated mounting structure.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

Referring now to the drawings in which like reference numbers represent corresponding parts throughout:

FIG. 2 depicts a conventional collimating lens, in which the optical axis of the collimating lens is not aligned with the apex axis of the corner cube retroreflector;

FIG. 2A depicts a conventional collimating lens, in which the optical axis of the collimating lens is not aligned with the principle axis of the diverging outgoing beam emitted by the waveguide aperture;

DETAILED DESCRIPTION OF THE INVENTION

The present invention provides an enhanced collimator for use with an improved precision metrology gauge. Additionally, the present invention provides for the achievement of a stable high measurement accuracy within a laboratory or measurement environment of diverse temperature gradients, without requiring perfect alignment of the collimator and/or retroreflecting element.

Figure 1:
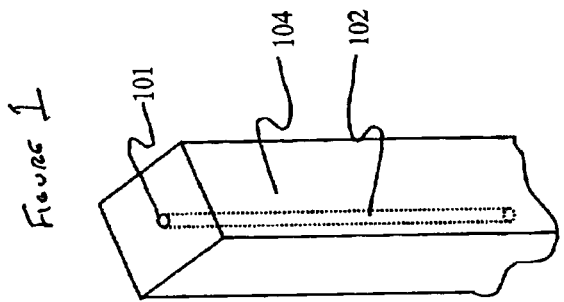
FIGS. 1 and 1A depict a conventional collimating lens, in which the numeric aperture of the collimating lens is smaller than the numeric aperture of the waveguide aperture light beam.
Figure 1A:
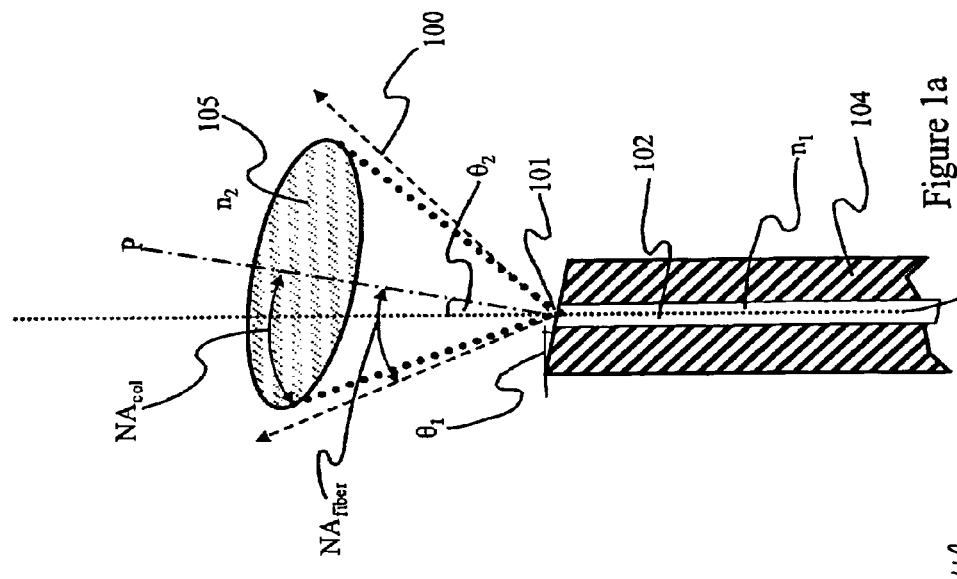
Figure 4A:
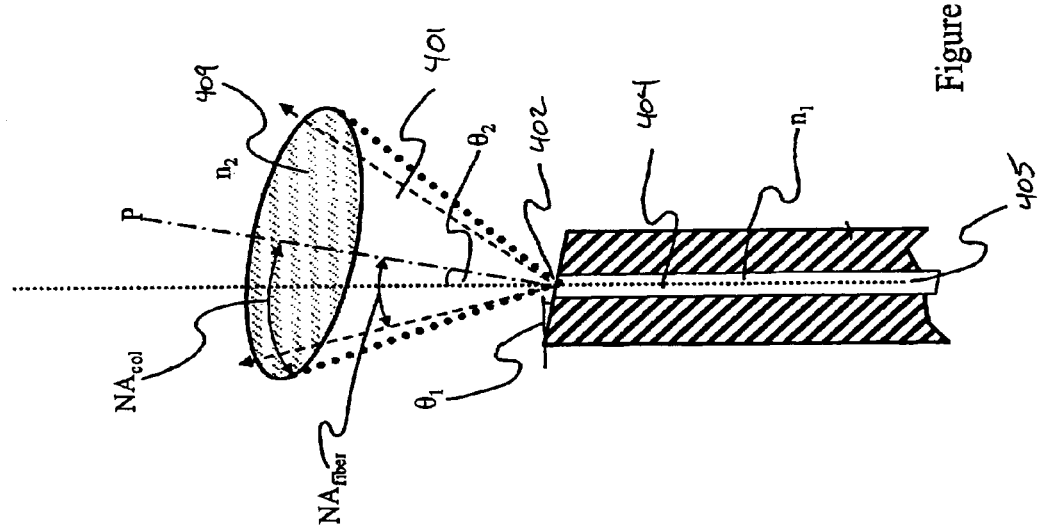
FIG. 4A depicts a collimating lens, in which the numeric aperture of the collimating lens is larger than the numeric aperture of the waveguide aperture light beam.
Figure 3:
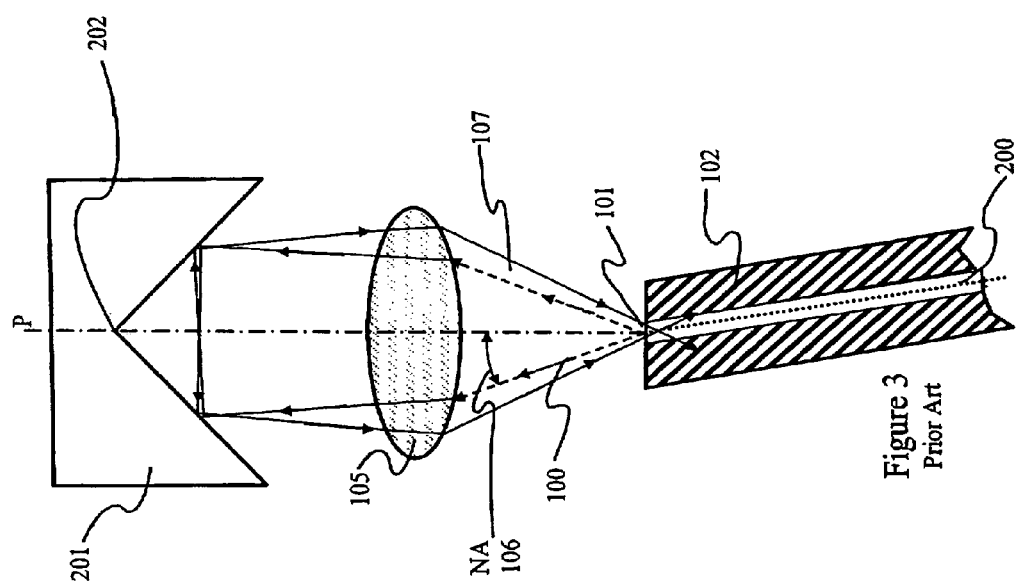
FIG. 3 depicts a conventional collimating lens, in which the optical focus lies after the optical focus of the fiber optic waveguide entrance aperture.
Figure 4:
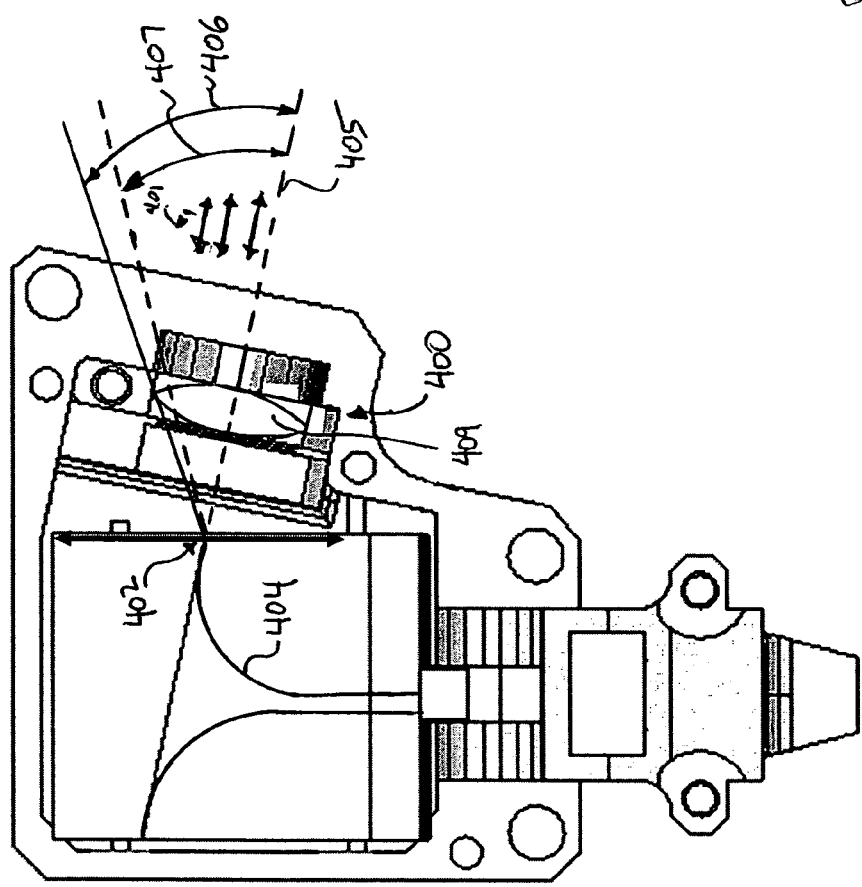
FIG. 4 depicts, according to one arrangement of the present invention, the top view of the exposed waveguide, the collimating lens mount and the signal input/signal output fiber optic bundle mount, with the enclosures removed.

FIGS. 4 and 4A depict the free-space optically-coupled collimator for the efficient bidirectional transmission of an optical metrology beam emanating from a waveguide aperture of a waveguide optical transmission element, according to one arrangement of the present invention. The focus of the collimator is set at the waveguide aperture of the waveguide optical transmission element, the optical axis of the collimator aligns with the optical metrology beam as it exits the waveguide aperture of the waveguide optical transmission element, and the numeric aperture of the collimator is equal to or larger than the numeric aperture of the optical metrology beam as it exits the waveguide aperture of the waveguide optical transmission element.

In more detail, FIG. 4 illustrates free-space optically-coupled collimator 400 for the efficient bidirectional transmission of optical metrology beam 401 emanating from waveguide aperture 402 of waveguide optical transmission element 404. The focus of collimator 400 is set at waveguide aperture 402 of waveguide optical transmission element 404, optical axis 405 of collimator 400 aligns with optical metrology beam 401 as it exits waveguide aperture 402 of waveguide optical transmission element 404, and numeric aperture 406 of collimator 400 is equal to or larger than numeric aperture 407 of optical metrology beam 401 as it exits waveguide aperture 402 of waveguide optical transmission element 404. Accordingly, a simplified, self aligning, minimal-adjustment, free-space optical coupler/collimator is provided for one or more optical arms of a planar waveguide interferometer, for inexpensive and convenient opto-mechanical alignment and manufacture.

Figure 8:
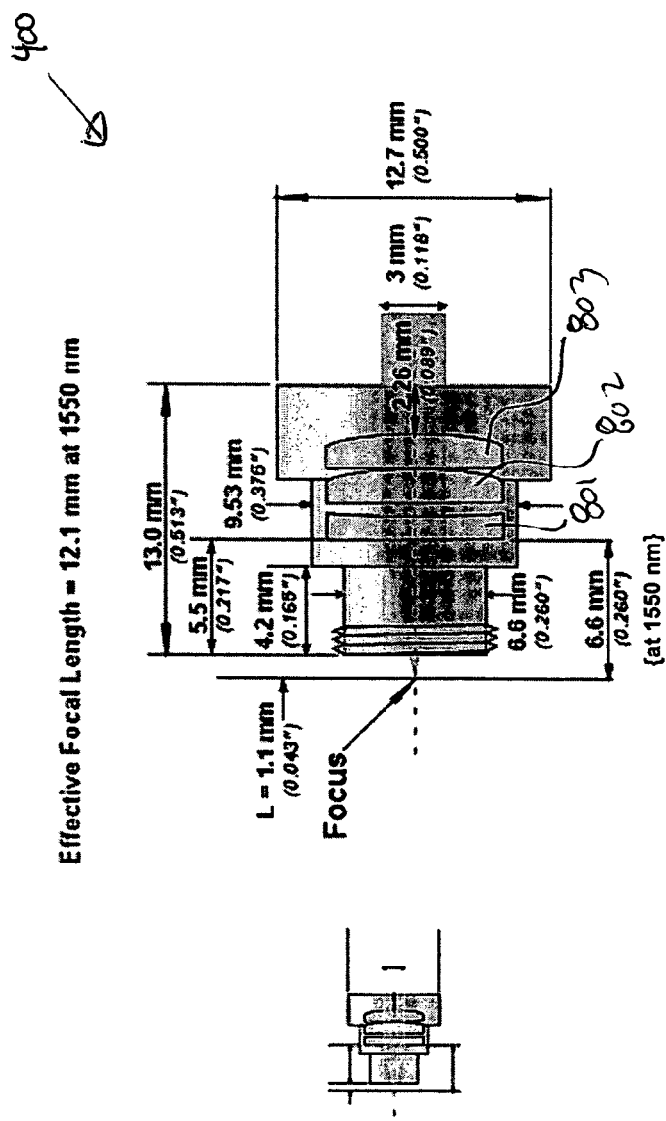
FIG. 8 is a side view illustration of a collimator which includes a plurality of refractive elements.

Free-space optically-coupled collimator 400 further includes at least one reflective or refractive element, such as refractive element 409, where the well-corrected free-space optically-coupled collimator 400 maintains the diffraction-limited wavefront of the optical metrology beam 401. Although collimator 400 is largely described and illustrated herein as including one refractive element, more than one refractive element, or one or more reflective elements, or any combination thereof may be used. FIG. 8, described more fully below, provides but one example of a collimator design according to the present invention which utilizes a plurality of refractive elements.

It is desirable, for the maximum beam collection efficiency by the waveguide aperture of the returning collimator-focused beam, that whatever the selected beam wavelength is employed, the optical f-number of the collimator will be selected such that the diameter of the focused beam is roughly equal to or smaller than the diameter of the waveguide aperture. Here, the beam diameter follows the Airy relation Beam Diameter (84% intensity point)=2.44× wavelength×f-number. In practice, beam diameters two-times larger will still perform quite well.

As illustrated in FIG. 4A, the collimating lens numeric aperture $NA_{col}$ is larger than the numeric aperture $NA_{fiber}$ of the fiber. When the lens numeric aperture is equal to or larger than the fiber numeric aperture, substantially all the exiting photons are collected by collimating lens 105. By collecting substantially all of the outgoing photon flux, the interferometer will have increased signal power and/or better sensitivity over conventional designs as a result.

Figure 5:
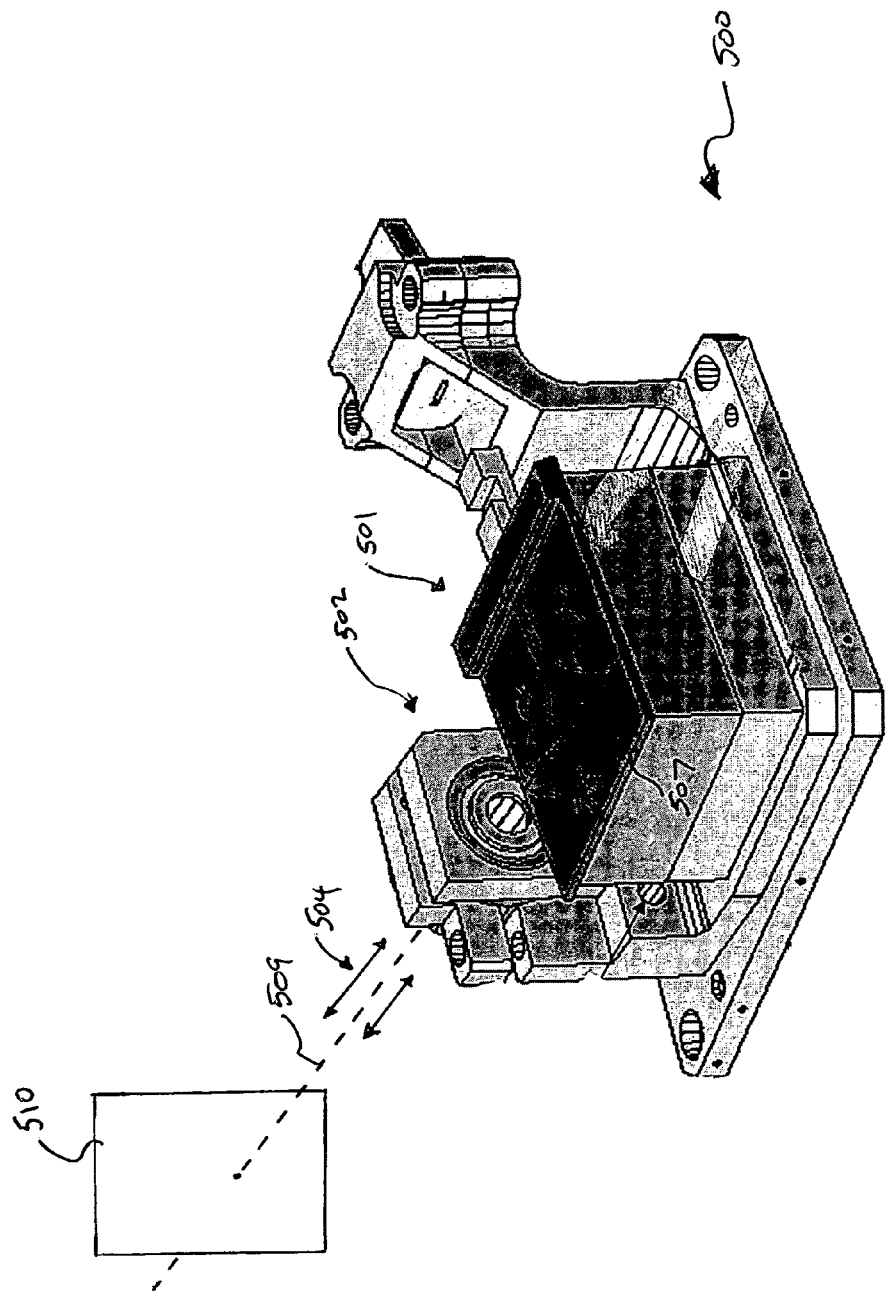
FIG. 5 depicts an interferometric optical metrology gauge system, with enclosures removed, including an interferometric waveguide device, and a free-space optically-coupled collimator for the efficient bidirectional transmission of the optical metrology beam emanating from a waveguide aperture of one of a plurality of waveguide optical transmission elements, according to a second arrangement of the present invention.

FIG. 5 depicts an interferometric optical metrology gauge system, including an interferometric device and a free-space optically-coupled collimator for the efficient bidirectional transmission of optical metrology beam emanating from a waveguide aperture of one of a plurality of waveguide optical transmission elements, according to a second arrangement of the present invention.

In more detail, interferometric optical metrology gauge system 500 includes interferometric device 501, and free-space optically-coupled collimator 502 for the efficient bidirectional transmission of optical metrology beam 504 emanating from waveguide aperture 505 of one of plurality of waveguide optical transmission elements 506.

Interferometric device 501 further includes a PLC including a plurality of waveguide optical transmission elements, including elements 506, embedded in substrate 507, and an input coupler and an output coupler arranged along the optical transmission elements and operable to determine reference and measurement optical phases, where optical pathlengths of the optical transmission elements between the input coupler and the output coupler are matched to compensate for thermal effects. The operation and configuration of interferometric device 501 and its associated components are described in great detail in Bell, which is incorporated herein by reference for all purposes. In this regard, further description of interferometric device 501 is largely omitted herein, for the sake of brevity.

Regarding free-space optically-coupled collimator 502, the focus of collimator 502 is set the waveguide aperture 505 of one of the plurality of waveguide optical transmission elements 506, optical axis 509 of collimator 502 aligns with optical metrology beam 504 as it exits waveguide aperture 505 of one of plurality of waveguide optical transmission elements 506. The numeric aperture of collimator 502 is equal to or larger than the numeric aperture of optical metrology beam 504 as it exits waveguide aperture 505 of one of plurality of waveguide optical transmission elements 506.

To its advantage, the major interferometer optical elements are subsumed into a single waveguide, and its waveguide output and return input is free-space coupled to an optical collimator. As such, a relatively low tolerance optical boresight is maintained between the waveguide and the collimator, so that the returning beam from the vertex of the retroreflector will stay in alignment with the outgoing beam and couple back into the waveguide. Small misalignments have little or no effect, as long as the outgoing beam intersects with the center of the retroreflector's vertex.

Interferometric optical metrology gauge system 500 further includes remote fiducial reference 510, remote fiducial reference 510 reflecting optical metrology beam 504 emanating from collimator 502 back to collimator 502. Remote fiducial reference 510 is a corner cube retroreflector, a spherical retroreflector, a "cats eye," a mirror, or other light reflecting device. Substrate 507 is comprised of silicon (Si) or other suitable material.

In the case where a cube corner or similar retroreflector is employed as remote fiducial reference 510 with respect to the metering interferometer, an efficient and simplified alignment and coupling to and from the planar waveguide entrance/exit aperture is achieved due to the self-aligning nature of beams returning from the vertex of a cube corner or similar retroreflector. Centered beams reflecting off the vertex of a cube corner will return back on the same path and vector entering the optics. In cases where the beam is collimated or with the beam waist/focus at the retroreflector, a high percentage of the beam is returned to the waveguide entrance/exit aperture with substantial optical coupling of the return beam into the waveguide.

Figure 6:
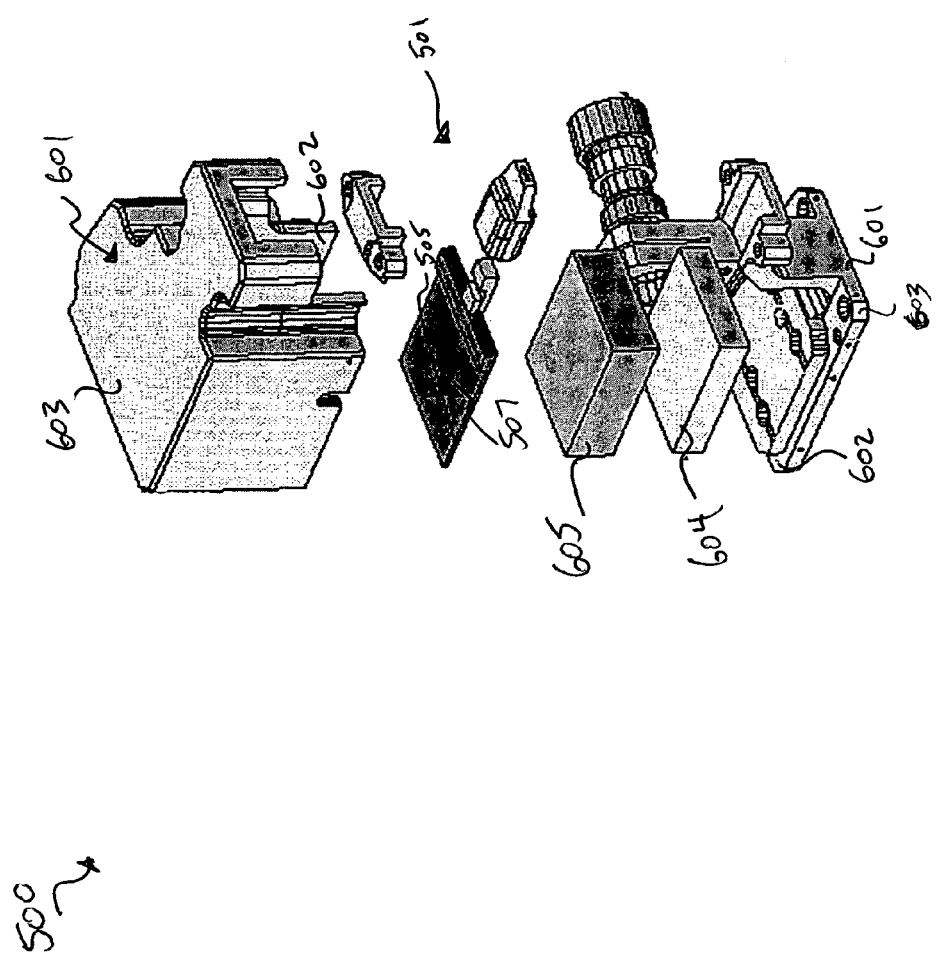
FIG. 6 depicts the inner case, which, according to a further aspect, encapsulates the interferometric device.

As illustrated in FIG. 6, interferometric optical metrology gauge system 500 further includes inner case 601 encapsulating interferometric device 501, inner case 601 forming an entrance/exit aperture (reference 701, in FIG. 7) adjacent to waveguide aperture 505. According to one aspect, internal surface 602 of inner case 601 is black and/or diffuse, and has an optical emissivity of approximately 1. According to a second aspect, exterior surface 603 of inner-case 601 is specular, with a low emissivity, below 0.1. Inner case 601 is comprised of aluminum (Al), copper (Cu), and/or other suitable materials.

Interferometric device 501 further includes base plate 604 in physical communication with inner case 601, silicon pedestal 605 mounted on base plate 604, and a potassium hydroxide (KOH)-based adhesive (not shown) in physical communication with and between substrate 507 and silicon pedestal 605.

The maintenance of an isothermal environment around the waveguide chip, especially across the opposing optical arms or channels of the waveguide, is preferable for obtaining high metrological measurement accuracy from the interferometer. In addition, a low stress chip mounting suppresses errors arising from thermal coefficient of expansion mismatches between the chip and its mounting structure.

Base plate 604 is comprised of the INVAR® 36 alloy, or other materials. A monolithic mounting structure of low coefficient of thermal expansion ("CTE"), such as the INVAR® 36 alloy, supporting the silicon substrate helps address dimensional uniformity and low thermal sensitivity characteristics between the waveguide and the optical collimator mounting. In order to reduce the stress contribution due to thermal expansion of mechanical mounts supporting the silicon pedestal base plate, the material chosen for the base plate is the INVAR® 36 alloy, although other materials or alloys can be used as well. The selection of the INVAR® 36 alloy is based upon its low thermal expansion properties. In alternate aspects, the monolithic mounting structure is comprised of another low-expansion material, such as silicon carbide, fused silica, the ZERODUR® alloy, or ultra-low expansion ("ULE") glass ceramic.

Substrate 507 is 0.5 millimeters thick, or 1 millimeter thick, and silicon pedestal 605 is 10 millimeters thick. The waveguide thickness may vary according to industry standards for the manufacture of optical waveguide circuits on and within a substrate. The supporting silicon pedestal thickness choice is based on the selection of a suitable thickness, where mechanical distortions occurring on the baseplate side of the pedestal will be damped and smoothed out, when propagated to the surmounted waveguide structure.

To efficiently mechanically and thermally couple the approximately one millimeter thick waveguide onto the robust thick substrate, a material possessing substantially the same CTE, such as 10 mm thick silicon, is bonded to the waveguide using a KOH-based agent, using a technique known as "KOH bonding." This type of bonding does not introduce a foreign layer and maintains substantially the same CTE and thermal transport between opposite sides of the bondline. Other, low-stress, thin bondline adhesives or bonding agents may also be employed, such as thermal grease, room temperature vulcanizing ("RTV") silicone, epoxy, or ultraviolet ("UV") adhesive. Furthermore, additional bonding methods, such as, flexure mounting, monolithic mounting, and optical contact, may also be utilized. In additional aspects, substrate 507 and silicon pedestal 605 are of differing or varying thicknesses.

According to the present embodiment, the silicon pedestal 605 is comprised of silicon, which matches the chemical, mechanical, and thermal conductive and thermal expansion coefficient of the silicon substrate of the optical waveguide. Although this embodiment is described as using silicon, any material that reduces mechanical and thermal stresses in the waveguide by matching the mechanical and thermal expansion properties of the waveguide substrate can be used.

Figure 7:
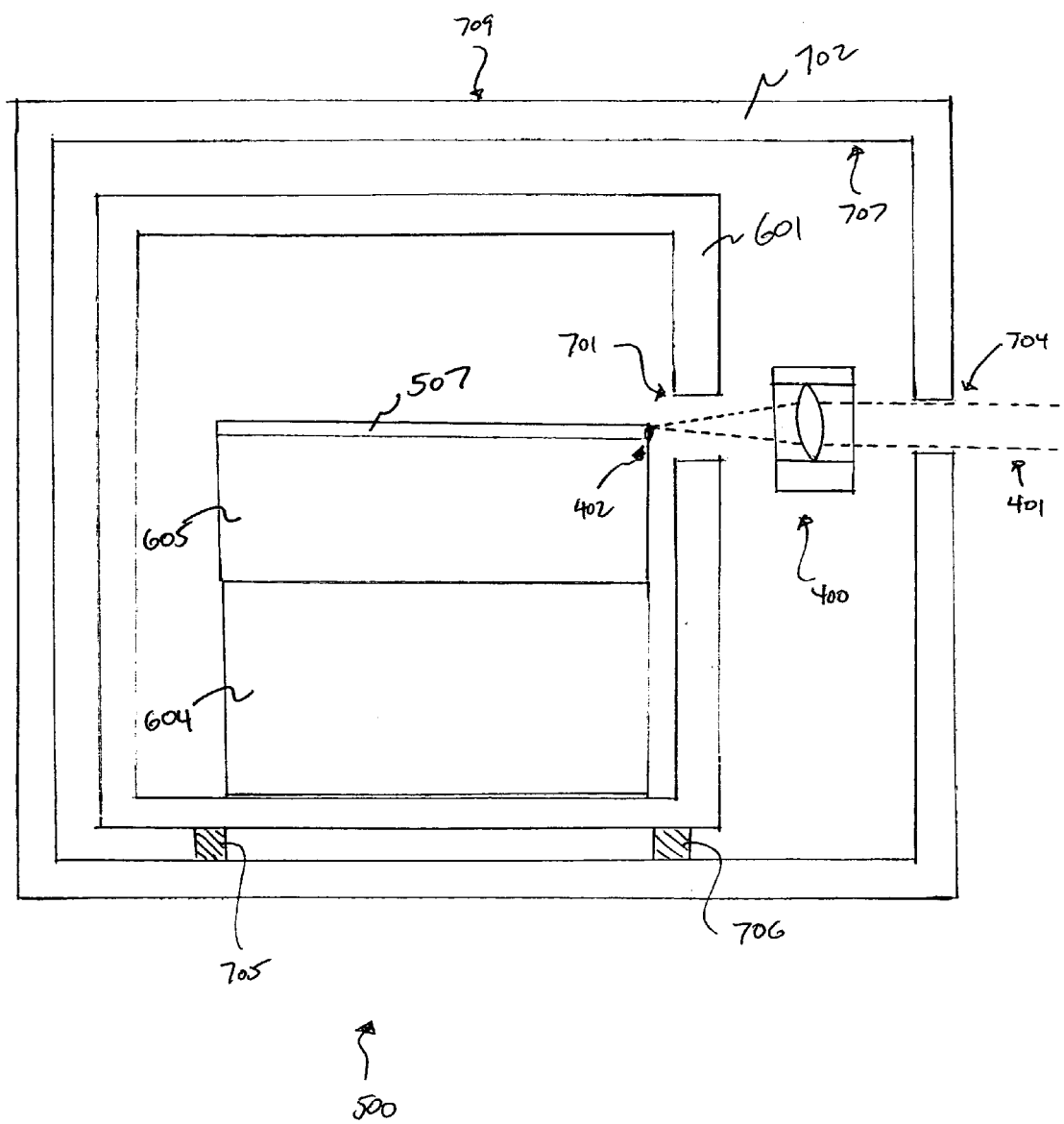
FIG. 7 depicts the outer case which, according to an additional aspect, encapsulates the inner case and the free-space optically-coupled collimator.

FIG. 7 depicts the outer case which, according to an additional aspect, encapsulates the inner case and the free-space optically-coupled collimator. As illustrated, interferometric optical metrology gauge system 500 further includes outer case 702 encapsulating inner case 601 and free-space optically-coupled collimator 502, outer case 702 forming collimator aperture 704 adjacent to free-space optically-coupled collimator 502. System 500 also includes at least one insulating support, such as insulating supports 705 and 706, in physical communication with and between inner case 601 and outer case 702. In additional aspects, the outer case is omitted.

Internal surface 707 of outer case 702 is black and/or diffuse, and exterior surface 709 of outer case 707 is specular.

The inner and outer cases surround the waveguide chip and its mount on all sides, where the internal faces of the cases have a high optical emissivity (~1) due to their black and diffuse surface. This characteristic enhances the omnidirectionality and uniformity of the cases' emission, as seen by the waveguide. To reduce and slow down the effects of thermal changes induced by external irradiation onto the housing, the cases outer surfaces have a broadband low emissivity, in that they are shiny, specular and highly reflective. Accordingly, the waveguide and its associated optical and mechanical mount elements are enclosed in its own isothermal environment. The unique compact and simple monolithic design of the interferometric optical metrology gauge system allow its external housing to be made relatively isothermal, overcoming the disadvantages of typical large optical interferometers, which have complex irregular paths and which are difficult to make thermally uniform.

The nested cases form an attenuated path for thermal radiation, convection and conductivity, isolating the interferometer waveguide optical circuit from the temperature variations in the external environment. According to this embodiment, inner case 601 and outer case 702 are made of aluminum (Al) and/or copper (Cu), although other materials, such as nonconductive plastics or ceramics may be employed that are provided with appropriate inner diffuse, high emissivity and outer specular, low emissivity coatings.

FIG. 8 is a side view illustration of a collimator which includes a plurality of refractive elements, according to one arrangement of the present invention. According to this arrangement, collimator 400 includes a plurality of refractive elements, including lenses 801 to 803. The placement of each lens, and lens measurements and characteristics are clearly notated in FIG. 8. The effective focal lens of the collimator according to this arrangement is 12.1 millimeters at 1550 nanometers, although any other wavelength may be employed when properly matched to the waveguide design.

Figure 9:
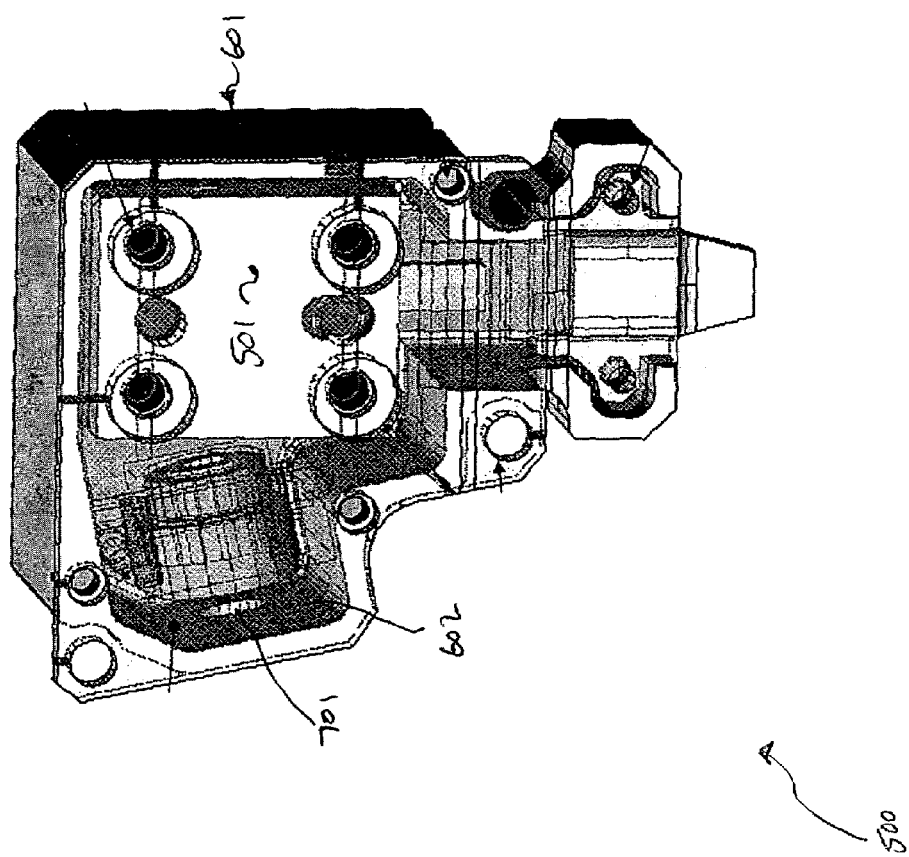
FIG. 9 illustrates the bottom view of the FIG. 5 interferometric optical metrology gauge system.
Figure 10:
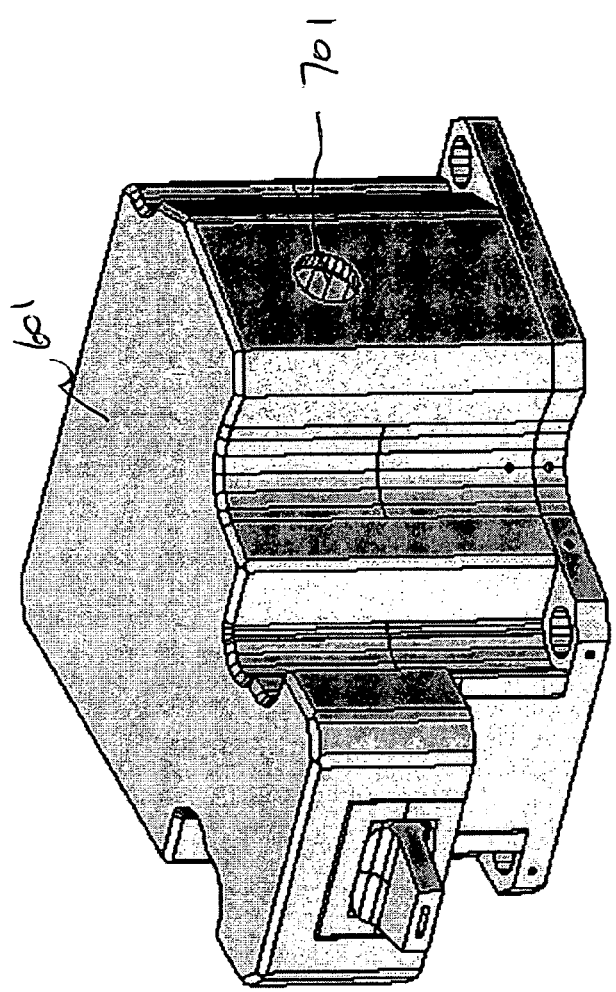
FIG. 10 illustrates a perspective view of the FIG. 5 interferometric optical metrology gauge system with the inner case in place, showing entrance/exit aperture.

FIG. 9 illustrates the bottom view of the FIG. 5 interferometric optical metrology gauge system, through the base plate, and FIG. 10 illustrates a perspective view of the FIG. 5 interferometric optical metrology gauge system with the inner case in place, showing entrance/exit aperture. Interferometric optical gauge system 500 includes inner case 601 encapsulating interferometric device 501, inner case 601 forming entrance/exit aperture 701 adjacent to the waveguide aperture. Internal surface 602 of inner case 691 is black and/or diffuse, and has an optical emissivity of approximately 1.

Figure 11:
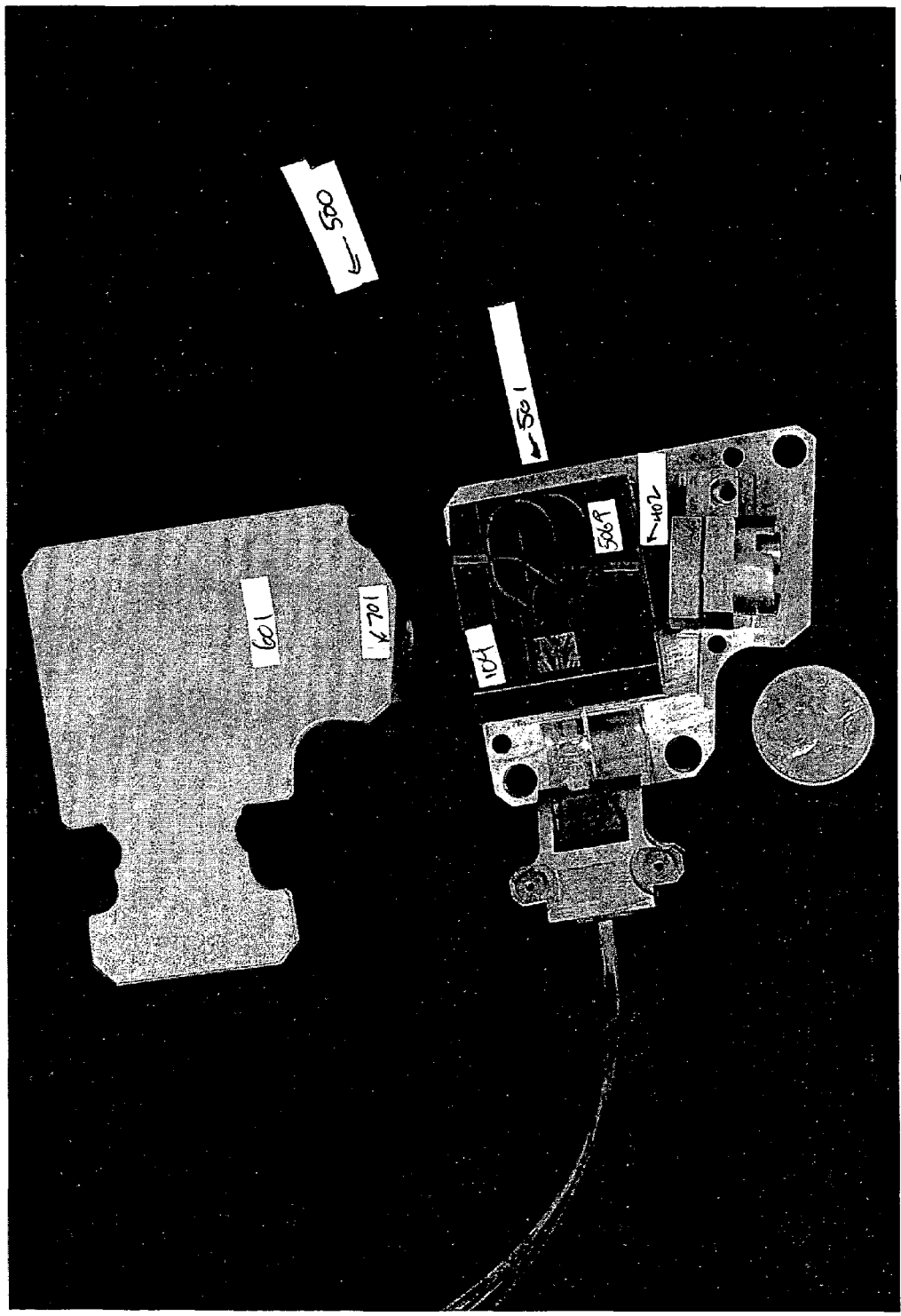
FIG. 11 illustrates a top view of the FIG. 5 interferometric optical metrology gauge system with the inner case removed.
Figure 12:
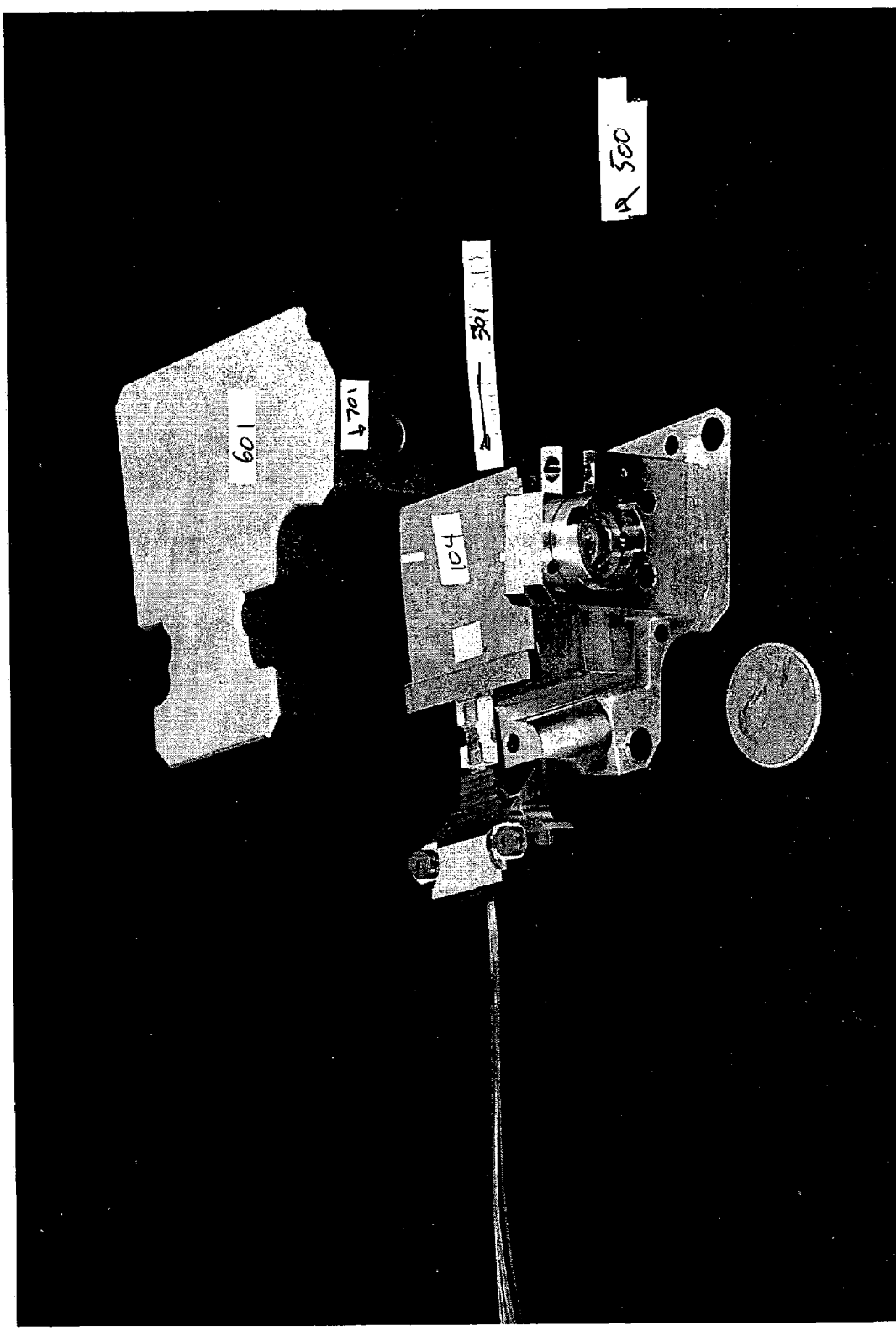
FIG. 12 illustrates a perspective view of the FIG. 5 interferometric optical metrology gauge system with the inner case removed.

FIG. 11 illustrates a top view of the FIG. 5 interferometric optical metrology gauge system with the inner case removed, and FIG. 12 illustrates a perspective view of the FIG. 5 interferometric optical metrology gauge system with the inner case removed. Interferometric device 501 includes PLC 104, PLC 104 further including plurality of waveguide optical transmission elements 506 embedded in the substrate. Interferometric optical gauge system 500 includes inner case 601 encapsulating interferometric device 501, inner case 601 forming entrance/exit aperture 701 adjacent to waveguide aperture 402.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A free-space optically-coupled collimator for the efficient bidirectional transmission of an optical metrology beam emanating from a waveguide aperture of a waveguide optical transmission element, wherein the focus of the collimator is set at the waveguide aperture of the waveguide optical transmission element, wherein the optical axis of the collimator aligns with the optical metrology beam as it exits the waveguide aperture of the waveguide optical transmission element, and wherein the numeric aperture of the collimator is equal to or larger than the numeric aperture of the optical metrology beam as it exits the waveguide aperture of the waveguide optical transmission element.

2. The free-space optically-coupled collimator according to claim 1, further comprising at least one reflective element.

3. The free-space optically-coupled collimator according to claim 1, further comprising at least one refractive element.

4. The free-space optically-coupled collimator according to claim 1, wherein the free-space optically-coupled collimator maintains high quality wavefront flatness necessary to return a focused beam to the waveguide aperture with minimal coupling losses.

5. An interferometric optical metrology gauge system, comprising:
   an interferometric device, said interferometric device further comprising:
      a planar lightwave circuit comprising a plurality of waveguide optical transmission elements embedded in a substrate, and
      an input coupler and an output coupler arranged along the optical transmission elements and operable to determine reference and measurement optical phases, wherein optical pathlengths of the optical transmission elements between the input coupler and the output coupler are matched to compensate for thermal effects; and
   a free-space optically-coupled collimator for the efficient bidirectional transmission of an optical metrology beam emanating from a waveguide aperture of one of the plurality of waveguide optical transmission elements,
      wherein the focus of the collimator is set at the waveguide aperture of the one of the plurality of waveguide optical transmission elements,
      wherein the optical axis of the collimator aligns with the optical metrology beam as it exits the waveguide aperture of the one of the plurality of waveguide optical transmission elements, and
      wherein the numeric aperture of the collimator is equal to or larger than the numeric aperture of the optical metrology beam as it exits the waveguide aperture of the one of the plurality of waveguide optical transmission elements.

6. The interferometric optical metrology gauge system according to claim 5, further comprising:
   a remote fiducial reference, said remote fiducial reference reflecting the optical metrology beam emanating from said collimator back to said collimator.

7. The interferometric optical metrology gauge system according to claim 6, wherein said remote fiducial reference is a corner cube retroreflector.

8. The interferometric optical metrology gauge system according to claim 6, wherein said remote fiducial reference is a spherical retroreflector.

9. The interferometric optical metrology gauge system according to claim 6, wherein said remote fiducial reference is a cats eye.

10. The interferometric optical metrology gauge system according to claim 6, wherein said remote fiducial reference is a mirror.

11. The interferometric optical metrology gauge system according to claim 5, wherein the substrate is comprised of silicon (Si).

12. The interferometric optical metrology gauge system according to claim 5, further comprising:
   an inner case encapsulating said interferometric device, said inner case forming an entrance/exit aperture adjacent to the waveguide aperture.

13. The interferometric optical metrology gauge system according to claim 5, wherein said interferometric device further comprises:
   a base plate in physical communication with said inner case;
   a silicon pedestal mounted on said base plate; and
   an adhesive in physical communication with and between the substrate and said silicon pedestal.

14. The interferometric optical metrology gauge system according to claim 12, wherein the internal surface of said inner case is black.

15. The interferometric optical metrology gauge system according to claim 12, wherein the exterior surface of said inner case is specular.

16. The interferometric optical metrology gauge system according to claim 12, wherein the internal surface of said inner case is diffuse.

17. The interferometric optical metrology gauge system according to claim 12, wherein the internal surface of said inner case has an optical emissivity of approximately 1.

18. The interferometric optical metrology gauge system according to claim 12, wherein said inner case is comprised of aluminum (Al).

19. The interferometric optical metrology gauge system according to claim 12, wherein said inner case is comprised of copper (Cu).

20. The interferometric optical metrology gauge system according to claim 13, wherein said base plate is comprised of the INVAR® 36 alloy.

21. The interferometric optical metrology gauge system according to claim 5, wherein the substrate is 1 millimeter thick.

22. The interferometric optical metrology gauge system according to claim 5, wherein the substrate is 0.5 millimeters thick.

23. The interferometric optical metrology gauge system according to claim 13, wherein said silicon pedestal is 10 millimeters thick.

24. The interferometric optical metrology gauge system according to claim 12, further comprising:
   an outer case encapsulating said inner case and said free-space optically-coupled collimator, said outer case forming a collimator aperture adjacent to said free-space optically-coupled collimator; and
   at least one insulating support in physical communication with and between said inner case and said outer case.

25. The interferometric optical metrology gauge system according to claim 24, wherein the internal surface of said outer case is black.

26. The interferometric optical metrology gauge system according to claim 24, wherein the internal surface of said outer case is diffuse.

27. The interferometric optical metrology gauge system according to claim 24, wherein the exterior surface of said outer case is specular.

28. The interferometric optical metrology gauge system according to claim 24, wherein said outer case is comprised of aluminum (Al).

29. The interferometric optical metrology gauge system according to claim 24, wherein said outer case is comprised of copper (Cu).

30. The interferometric optical metrology gauge system according to claim 12, wherein said inner case is comprised of a nonconductive plastic material.

31. The interferometric optical metrology gauge system according to claim 12, wherein said inner case is comprised of a ceramic material.

32. The interferometric optical metrology gauge system according to claim 13, wherein said base plate is comprised of a material with low thermal expansion properties.

33. The interferometric optical metrology gauge system according to claim 5, wherein the substrate thickness meets industry standards for optical waveguide circuits on and within a substrate.

34. The interferometric optical metrology gauge system according to claim 13, wherein said silicon pedestal is selected of a thickness to damp out mechanical distortions occurring adjacent to said baseplate.

35. The interferometric optical metrology gauge system according to claim 24, wherein said outer case is comprised of a nonconductive plastic material.

36. The interferometric optical metrology gauge system according to claim 24, wherein said outer case is comprised of a ceramic material.

37. The interferometric optical metrology gauge system according to claim 13, wherein said adhesive is a potassium hydroxide (KOH)-based adhesive.

38. The interferometric optical metrology gauge system according to claim 13, wherein said adhesive does not introduce mechanical and/or thermally induced stresses.

39. The interferometric optical metrology gauge system according to claim 13, wherein said adhesive is an epoxy adhesive.

40. The interferometric optical metrology gauge system according to claim 13, wherein said adhesive is silicon rubber.

* * * * *